United States Patent
Kwon et al.

(10) Patent No.: US 11,703,991 B2
(45) Date of Patent: Jul. 18, 2023

(54) DISPLAY DEVICE WITH MOUSE CONTROL AND OPERATING METHOD THEREOF

(71) Applicant: LG ELECTRONICS INC., Seoul (KR)

(72) Inventors: Jeonghwan Kwon, Seoul (KR); Kyungnam Bae, Seoul (KR); Taejin Park, Seoul (KR); Eunjung Lee, Seoul (KR); Hyojeong Jeong, Seoul (KR); Donghee Lee, Seoul (KR); Byounghyun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/647,078

(22) Filed: Jan. 5, 2022

(65) Prior Publication Data
US 2023/0176705 A1 Jun. 8, 2023

(30) Foreign Application Priority Data

Dec. 6, 2021 (KR) .......................... 10-2021-0172729

(51) Int. Cl.
*G06F 3/04812* (2022.01)
*G06F 3/14* (2006.01)

(52) U.S. Cl.
CPC ........ *G06F 3/04812* (2013.01); *G06F 3/1454* (2013.01); *G06F 2203/0383* (2013.01)

(58) Field of Classification Search
CPC .......................... G06F 3/04812; G06F 3/1454
See application file for complete search history.

(56) References Cited

U.S. PATENT DOCUMENTS

| | | | |
|---|---|---|---|
| 5,831,609 A * | 11/1998 | London | G06F 9/452 715/746 |
| 6,229,537 B1 * | 5/2001 | Sobeski | G09G 5/14 715/781 |
| 9,064,292 B1 * | 6/2015 | Tidd | G06T 1/00 |
| 2011/0015918 A1 * | 1/2011 | Kalbarga | G06F 13/105 703/23 |
| 2011/0148761 A1 * | 6/2011 | Jeong | G06F 3/0481 345/157 |
| 2011/0202872 A1 * | 8/2011 | Park | G06F 9/451 715/788 |
| 2012/0081396 A1 * | 4/2012 | Yusupov | H04L 67/1095 345/635 |

(Continued)

OTHER PUBLICATIONS

LG Electronics Inc., "New concept wireless private screen LG StandbyME unveiled", Jul. 15, 2021, 6 pages.

*Primary Examiner* — Justin R. Blaufeld
(74) *Attorney, Agent, or Firm* — Lee Hong Degerman Kang Waimey

(57) ABSTRACT

According to an embodiment of the present disclosure, a display device may include a wireless communication unit configured to wirelessly receive a first video signal based on a first video being displayed by a terminal, a display unit configured to display a first mirroring video based on the first video signal, and a control unit configured to receive a user input while the first mirroring video is being displayed, and transmit, to the terminal, a packet that does not include a mouse cursor parameter for requesting coordinates of a mouse cursor when the received user input is a touch input.

10 Claims, 11 Drawing Sheets

(56) References Cited

U.S. PATENT DOCUMENTS

| | | | | |
|---|---|---|---|---|
| 2012/0151373 A1* | 6/2012 | Kominac | .............. | H04L 67/141 |
| | | | | 715/740 |
| 2012/0167005 A1* | 6/2012 | Matthews | ................ | G09G 5/14 |
| | | | | 715/781 |
| 2012/0304102 A1* | 11/2012 | LeVee | .................... | G06F 9/451 |
| | | | | 715/764 |
| 2012/0304103 A1* | 11/2012 | LeVee | ............... | H04M 1/72469 |
| | | | | 715/764 |
| 2012/0324365 A1* | 12/2012 | Momchilov | ............ | H04L 67/01 |
| | | | | 715/738 |
| 2013/0009873 A1* | 1/2013 | Huang | ................. | H04L 65/756 |
| | | | | 345/173 |
| 2013/0031618 A1* | 1/2013 | Momchilov | ............ | H04L 67/10 |
| | | | | 726/7 |
| 2013/0139103 A1* | 5/2013 | Laborczfalvi | ......... | G06F 3/0481 |
| | | | | 715/781 |
| 2013/0246565 A1* | 9/2013 | Froelicher | .......... | H04N 21/4108 |
| | | | | 709/217 |
| 2013/0328779 A1* | 12/2013 | Butner | .................... | G06F 3/017 |
| | | | | 345/157 |
| 2014/0009394 A1* | 1/2014 | Lee | ......................... | G06F 3/038 |
| | | | | 345/157 |
| 2014/0033271 A1* | 1/2014 | Barton | .................. | H04W 12/64 |
| | | | | 726/1 |
| 2014/0101675 A1* | 4/2014 | VanBlon | ................. | G06F 9/451 |
| | | | | 719/319 |
| 2014/0198044 A1* | 7/2014 | Wang | ................. | H04N 21/42228 |
| | | | | 345/173 |
| 2015/0002369 A1* | 1/2015 | Araki | .................... | G06F 3/1438 |
| | | | | 345/1.1 |
| 2015/0281333 A1* | 10/2015 | Albert | .................... | G06F 16/972 |
| | | | | 715/744 |
| 2015/0319215 A1* | 11/2015 | Scoda | ................. | G06F 3/04847 |
| | | | | 715/740 |
| 2016/0248838 A1* | 8/2016 | AbiEzzi | ................ | H04L 67/303 |
| 2016/0259434 A1* | 9/2016 | Kato | .................... | G06F 3/1454 |
| 2016/0330260 A1* | 11/2016 | Ruge | .................... | G06F 3/04812 |
| 2018/0040293 A1* | 2/2018 | He | ................ | G09G 5/006 |
| 2018/0070122 A1* | 3/2018 | Baek | ................ | H04N 21/4438 |
| 2022/0113929 A1* | 4/2022 | Yu | ....................... | G06F 3/04883 |

\* cited by examiner

FIG. 7A
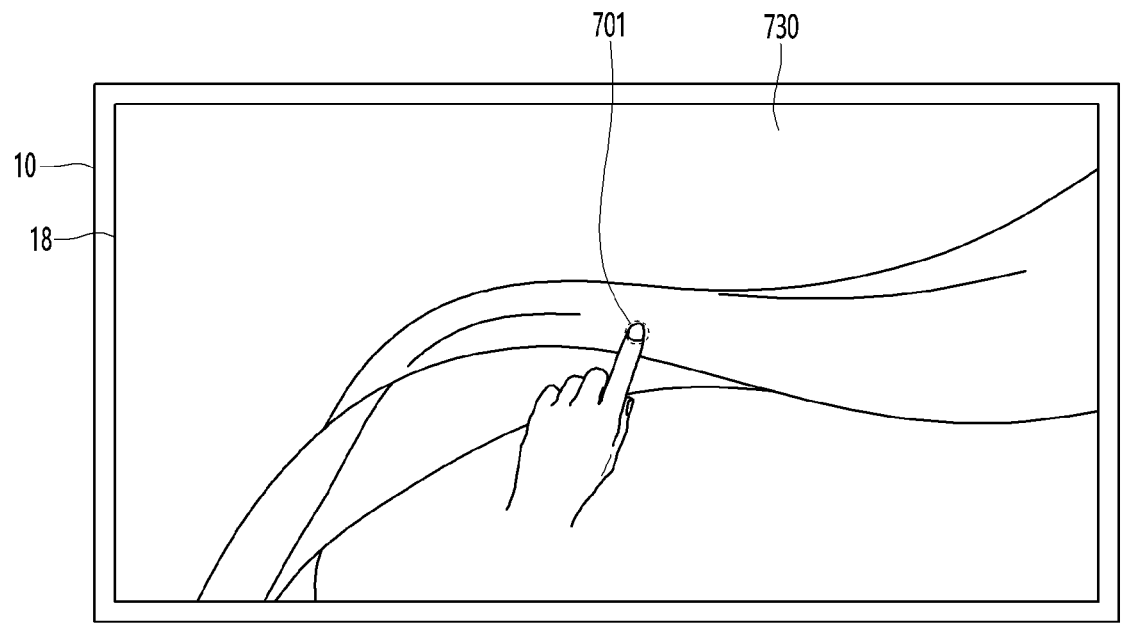
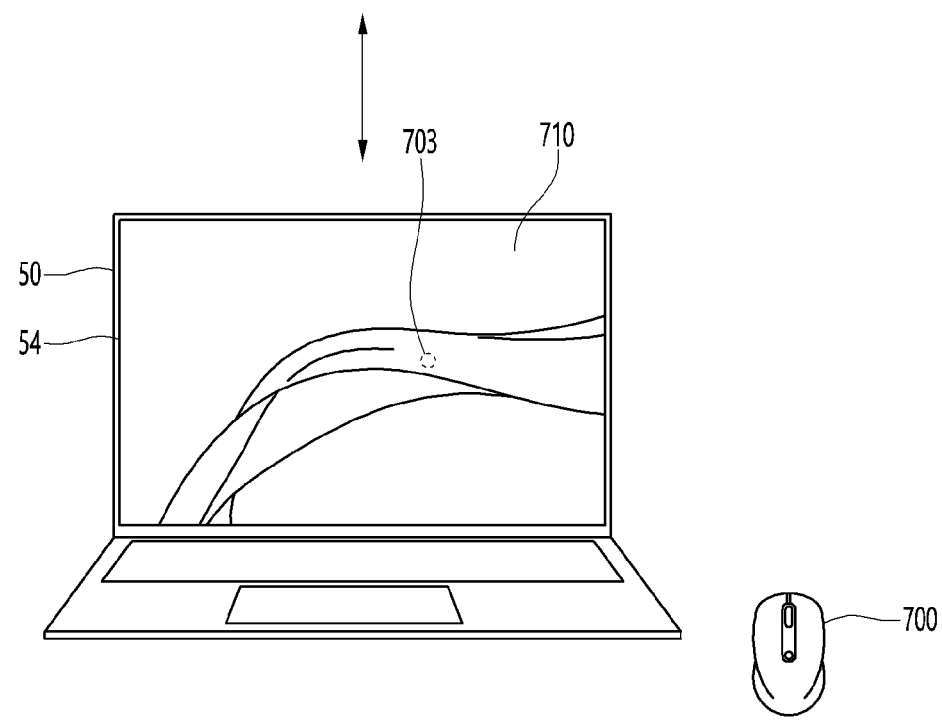

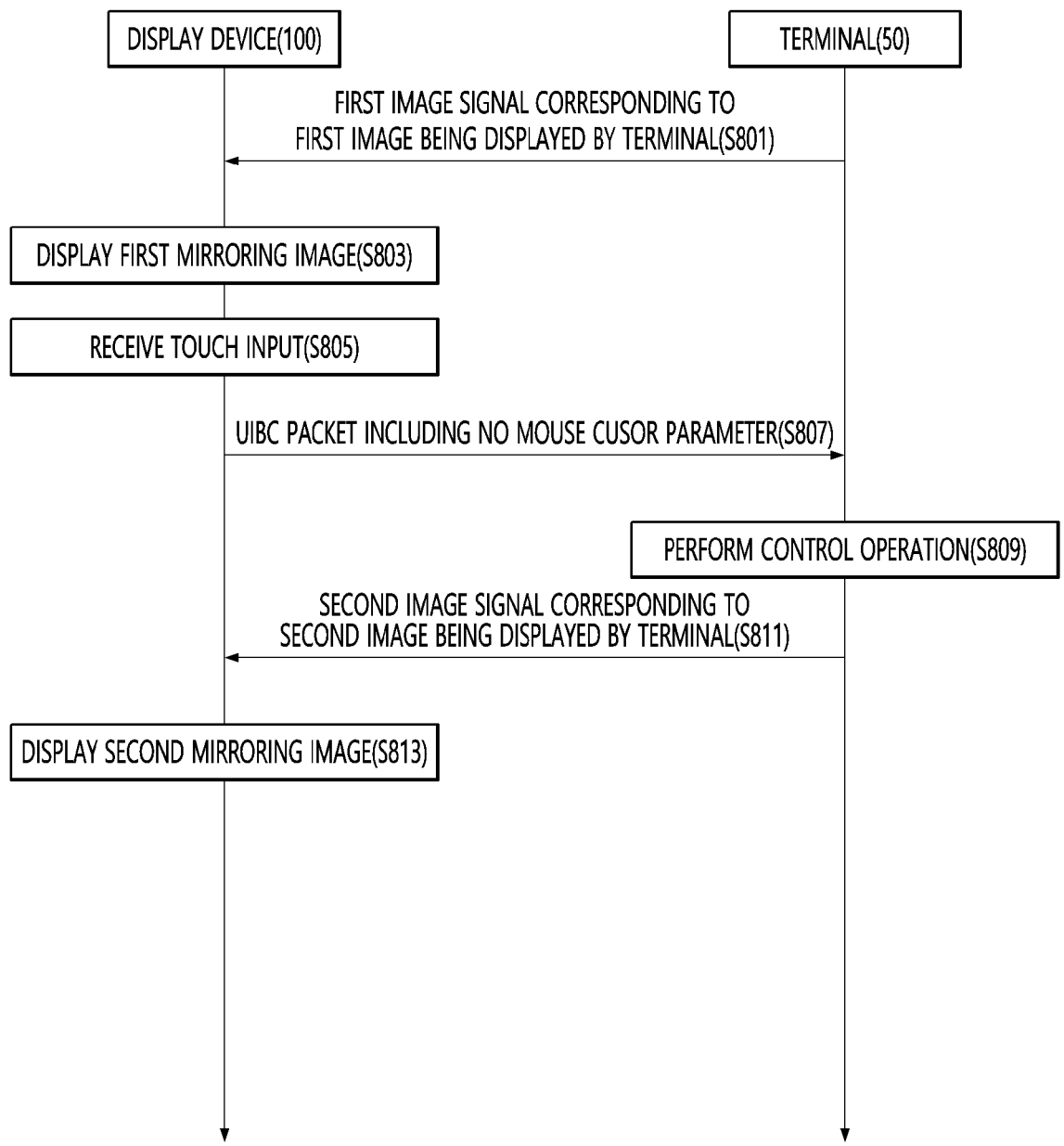

FIG. 9A
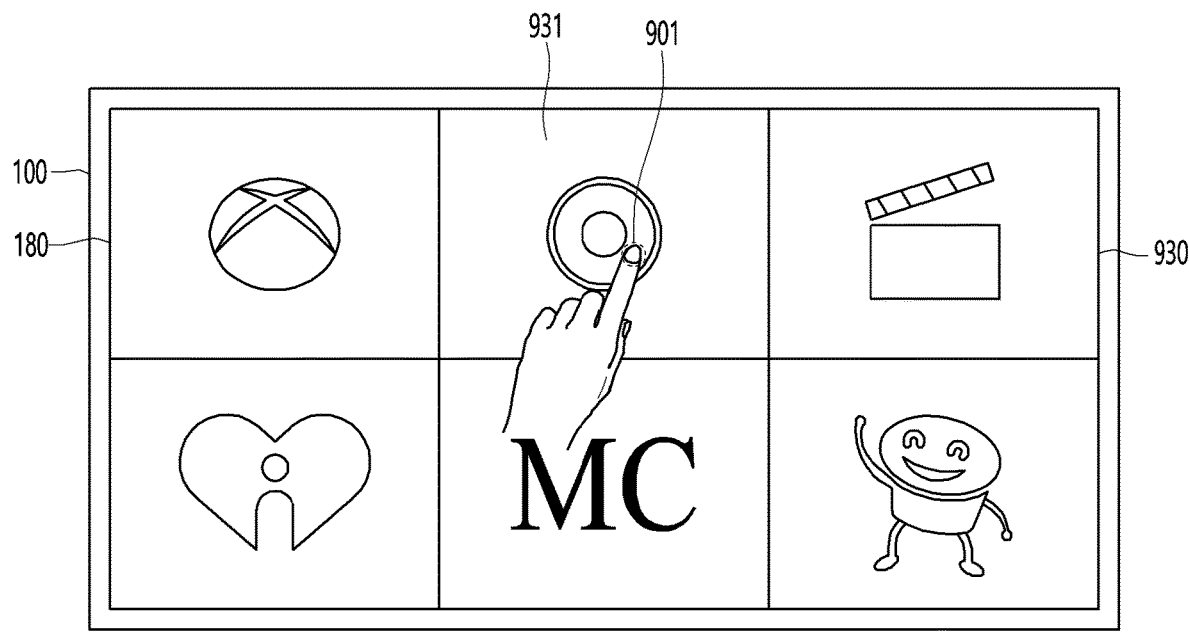
UIBC Packet including no mouse cusor parameter
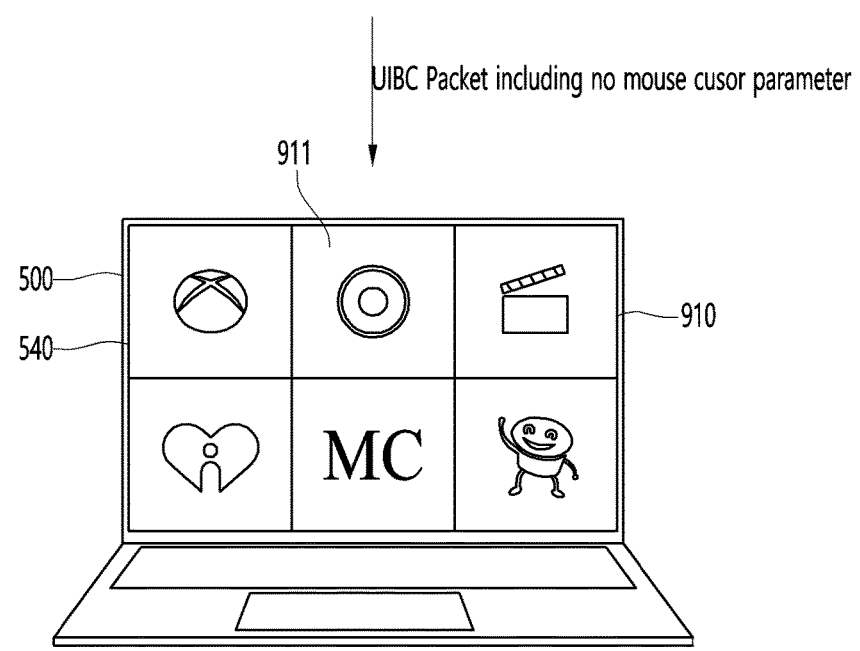

FIG. 9B
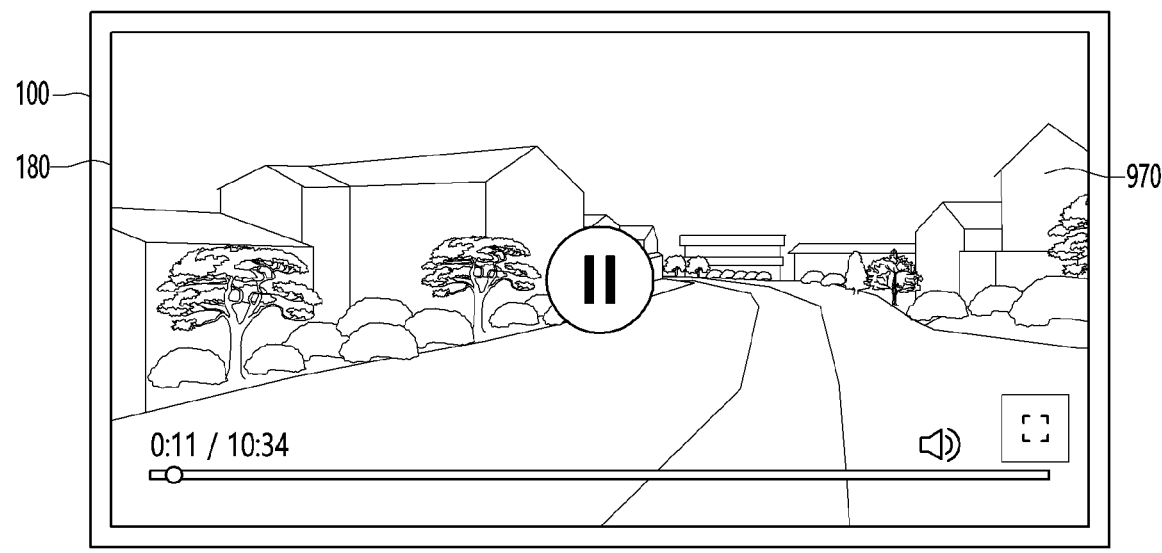
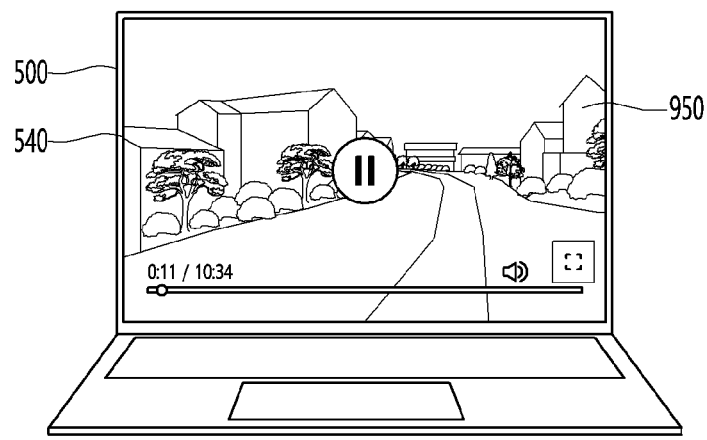

DISPLAY DEVICE WITH MOUSE CONTROL AND OPERATING METHOD THEREOF

CROSS-REFERENCE TO RELATED APPLICATIONS

Pursuant to 35 U.S.C. § 119 (a), this application claims the benefit of an earlier filing date and right of priority to Korean Patent Application No. 10-2021-0172729 filed on Dec. 6, 2021, the contents of which are hereby incorporated by reference herein in their entirety.

BACKGROUND OF THE INVENTION

1. Field of the Invention

The present disclosure relates to a display device and an operating method thereof.

2. Discussion of the Related Art

Digital TV services using wired or wireless communication networks are becoming common. The digital TV services may provide various services that cannot be provided by existing analog broadcasting services.

For example, IPTV (Internet Protocol Television) and smart TV services, which are types of digital TV services, provide interactive interfaces that enable users to actively select a type of a viewing program and a viewing time. IPTV and smart TV services may provide various additional services, such as Internet search, home shopping, and online games, based on the interactive interface.

In addition, a recent TV provides a screen mirroring function such as screen sharing with a terminal.

In particular, the TV may provide a screen sharing service with a terminal such as a PC. Conventionally, when a mouse is moved in a PC, the coordinates of the mouse are transmitted to the TV, and the TV has a mouse cursor function to display a cursor at relevant coordinates.

The mouse cursor function is a function for quickly transmitting the coordinates of the mouse cursor to the TV such that the TV displays a mouse cursor with a different type from a cursor that moves according to the movement of the mouse displayed on a terminal.

However, when a TV supporting touch UIBC (User Input Back Channel) transmits a touch input to the terminal, the terminal transmits the mouse cursor coordinates corresponding to the location of a touch input to the TV, and the TV displays a mouse cursor based on the mouse cursor coordinates.

In this case, when the TV receives a touch input and a mouse input, the mouse cursor is displayed in both cases, causing a problem in that the touch input and the mouse input are not distinguished.

SUMMARY OF THE INVENTION

An object of the present disclosure is to prevent an external device from sending coordinates of a mouse cursor when a display device is operated through a touch interface during mirroring to an external device.

An object of the present disclosure is to prevent a mouse cursor from being displayed on a display device when a display device is operated through a touch interface during mirroring to an external device.

According to an embodiment of the present disclosure, a display device may include a wireless communication unit configured to wirelessly receive a first video signal based on a first video being displayed by a terminal, a display unit configured to display a first mirroring video based on the first video signal, and a control unit configured to receive a user input while the first mirroring video is being displayed, and transmit, to the terminal, a packet that does not include a mouse cursor parameter for requesting coordinates of a mouse cursor when the received user input is a touch input.

According to the various embodiments of the present disclosure, even when a touch input is applied to the display device that is a sink device while a screen sharing service is being provided, the mouse cursor may not be displayed. Accordingly, an unnecessary mouse cursor may not be displayed on the display device, and a control operation of the terminal according to a touch input may be performed naturally.

Further, it is possible to reduce data resources required for displaying the mouse cursor and provide simple user experience.

BRIEF DESCRIPTION OF THE DRAWINGS

FIGS. 7A and 7B are diagrams for describing an operation scenario of using a user input back channel (UIBC) according to the related art.

FIG. 8 is a ladder diagram for describing a method of operating a screen sharing system according to an embodiment of the present disclosure.

FIGS. 9A and 9B are diagrams for describing a process in which a control operation of a terminal is performed according to a UMC packet that does not include a mouse cursor parameter.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
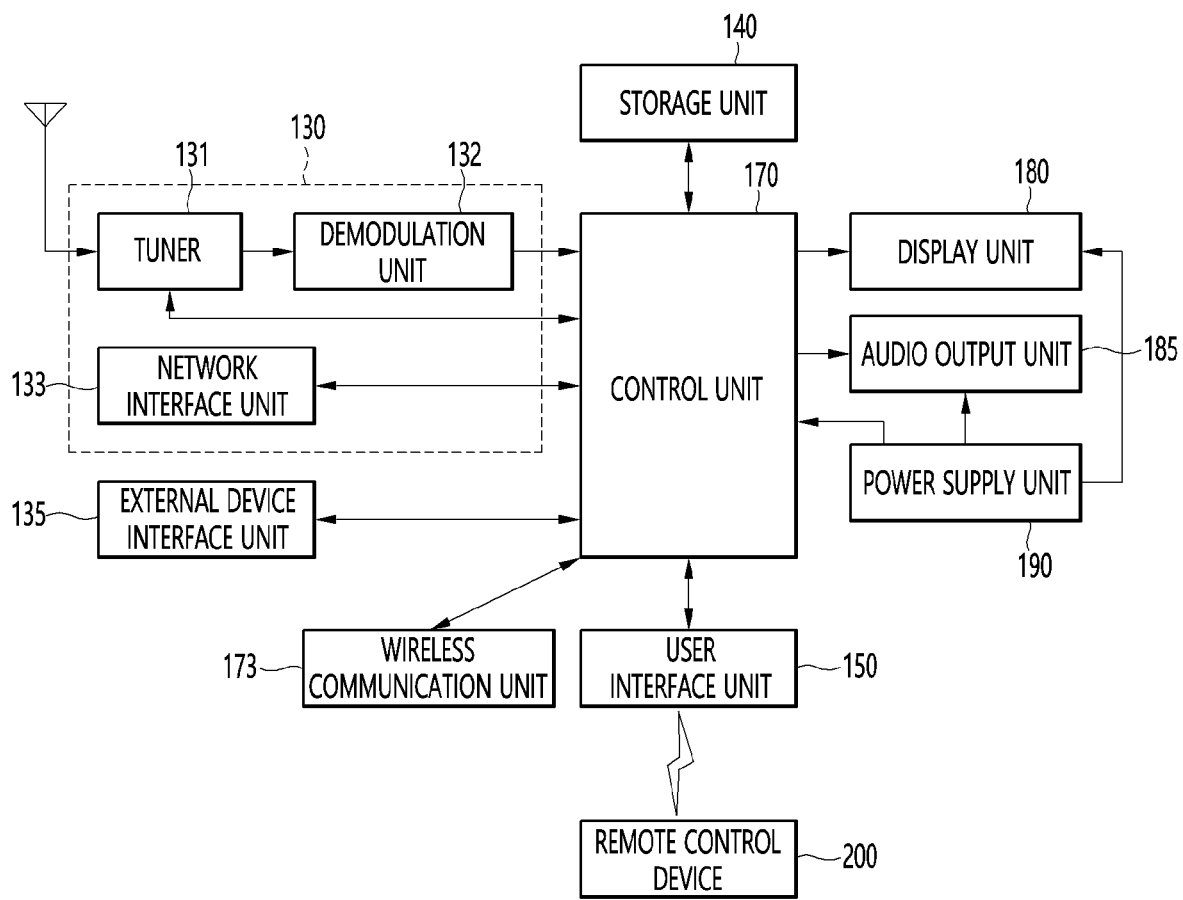
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100.

Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
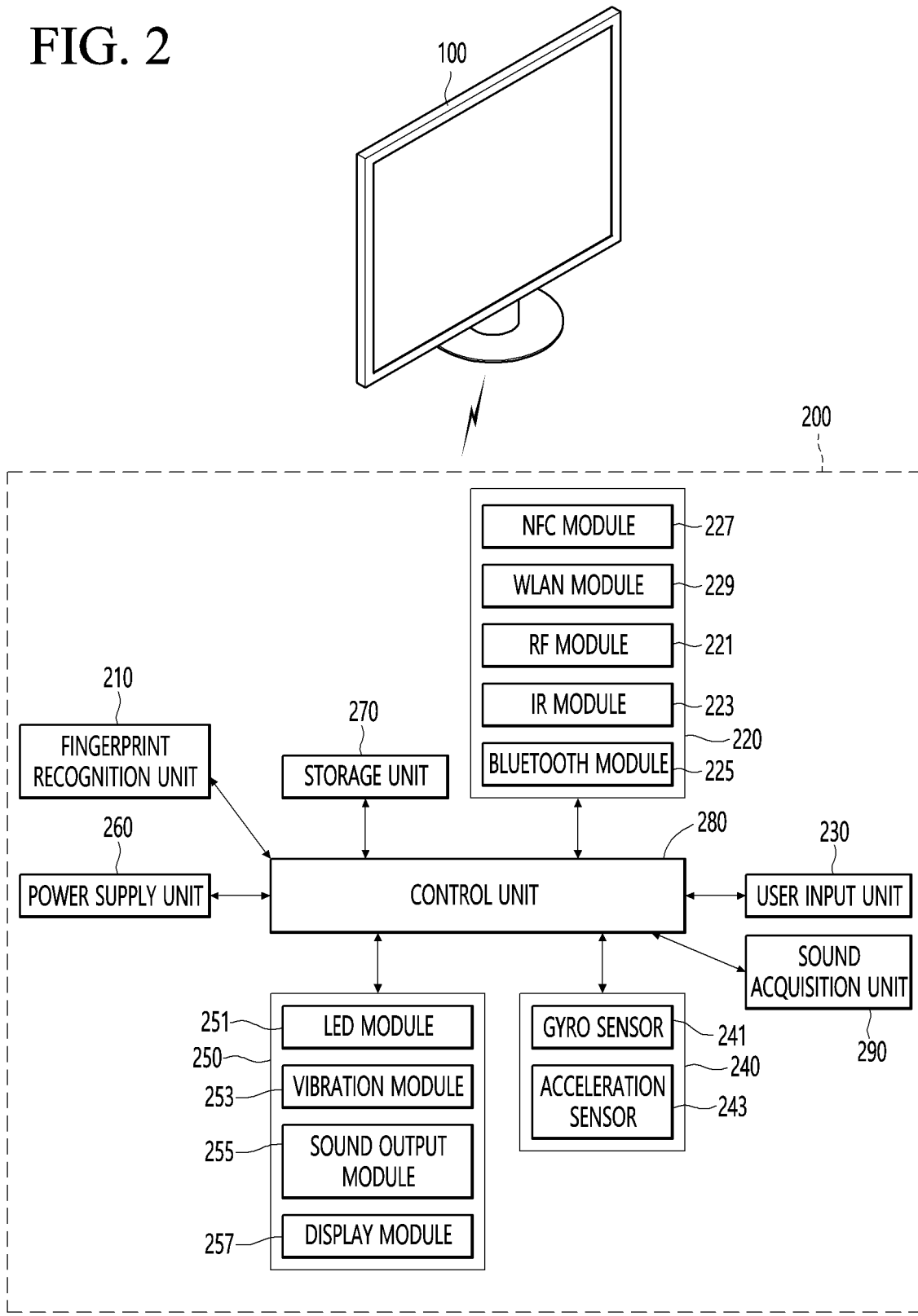
FIG. 2 is a block diagram illustrating a remote control device according to an embodiment of the present disclosure.
Figure 3:
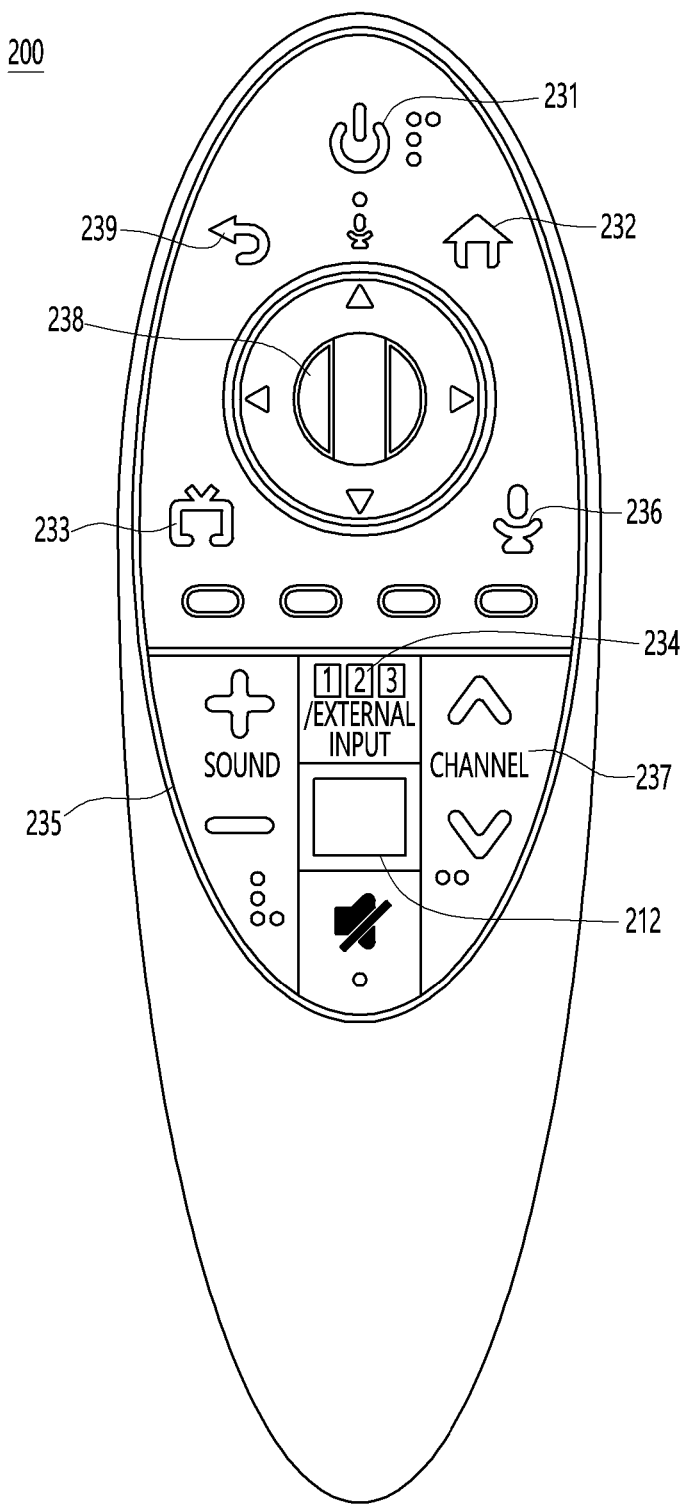
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice.

The sound acquisition unit 290 can include at least one microphone and obtain voice through the microphone 291.

Figure 4:
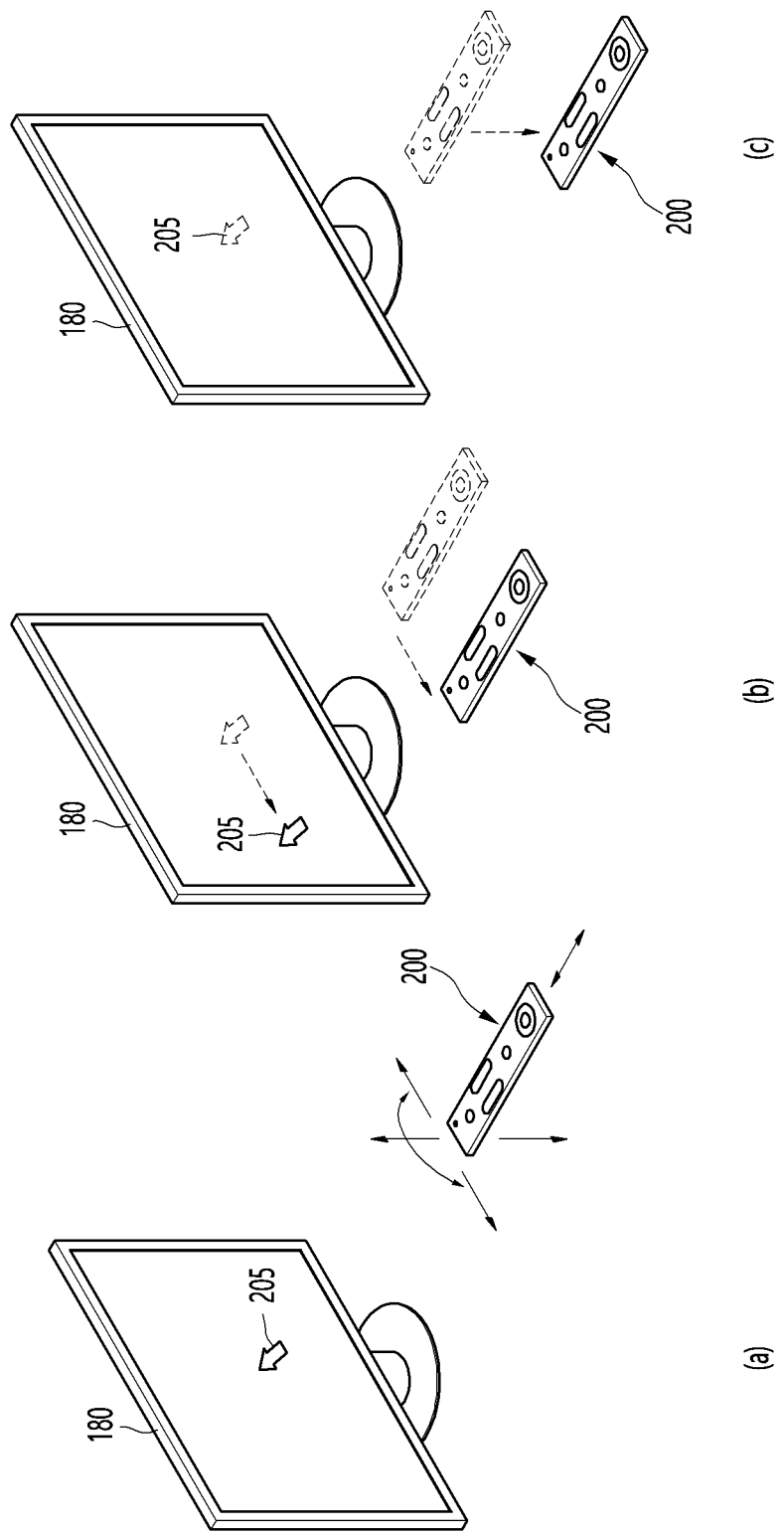
FIG. 4 is a view of utilizing a remote control device according to an embodiment of the present disclosure.

FIG. 4 is a view of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display unit 180. Thus, a selection area in the display unit 180 corresponding to the pointer 205 can be zoomed in and displayed larger. On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
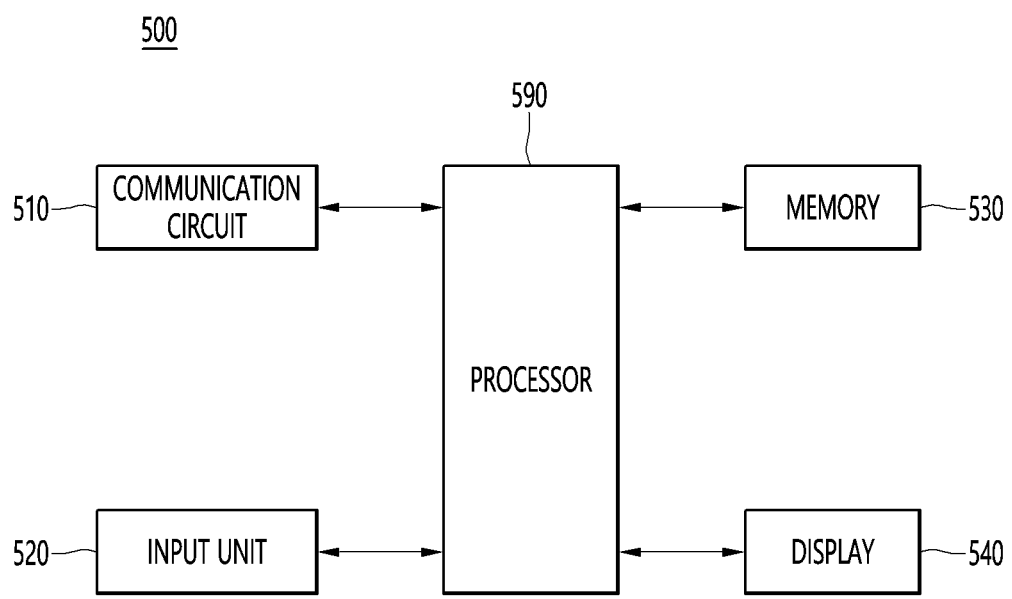
FIG. 5 is a block diagram for describing a configuration of a terminal according to an embodiment of the present disclosure.

FIG. 5 is a block diagram for describing a configuration of a terminal according to an embodiment of the present disclosure.

A terminal 500 may be implemented as a desktop computer, a notebook computer, a fixed device, or a mobile device.

Referring to FIG. 5, the terminal 500 may include a communication circuit 510, an input unit 520, a memory 530, a display 540, and a processor 590.

The communication circuit 510 may transmit/receive data to and from external devices such as other terminals or servers using wired/wireless communication technology.

The communication technology used by the communication unit 510 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

At this time, the input unit 520 may include a camera for inputting a video signal, a microphone for receiving an audio signal, and a user input unit for receiving information from a user.

The camera or the microphone may be treated as a sensor, and the signal acquired from the camera or the microphone may be referred to as sensing data or sensor information.

The memory 530 may store input data and/or output data generated according to the operation of the processor 500.

The display 540 may display a video signal received from the microcomputer 290.

The processor 590 may control overall operation of the recognition device 500.

When the connection of an external device is required to perform the determined operation, the processor 590 may generate a control signal for controlling the external device and may transmit the generated control signal to the external device.

The processor 590 may acquire intention information for the user input and may determine the user's requirements based on the acquired intention information.

The processor 590 may control at least part of the components of AI device 100 so as to drive an application program stored in memory 530.

Furthermore, the processor 590 may operate two or more of the components included in the AI device 100 in combination so as to drive the application program.

Figure 6:
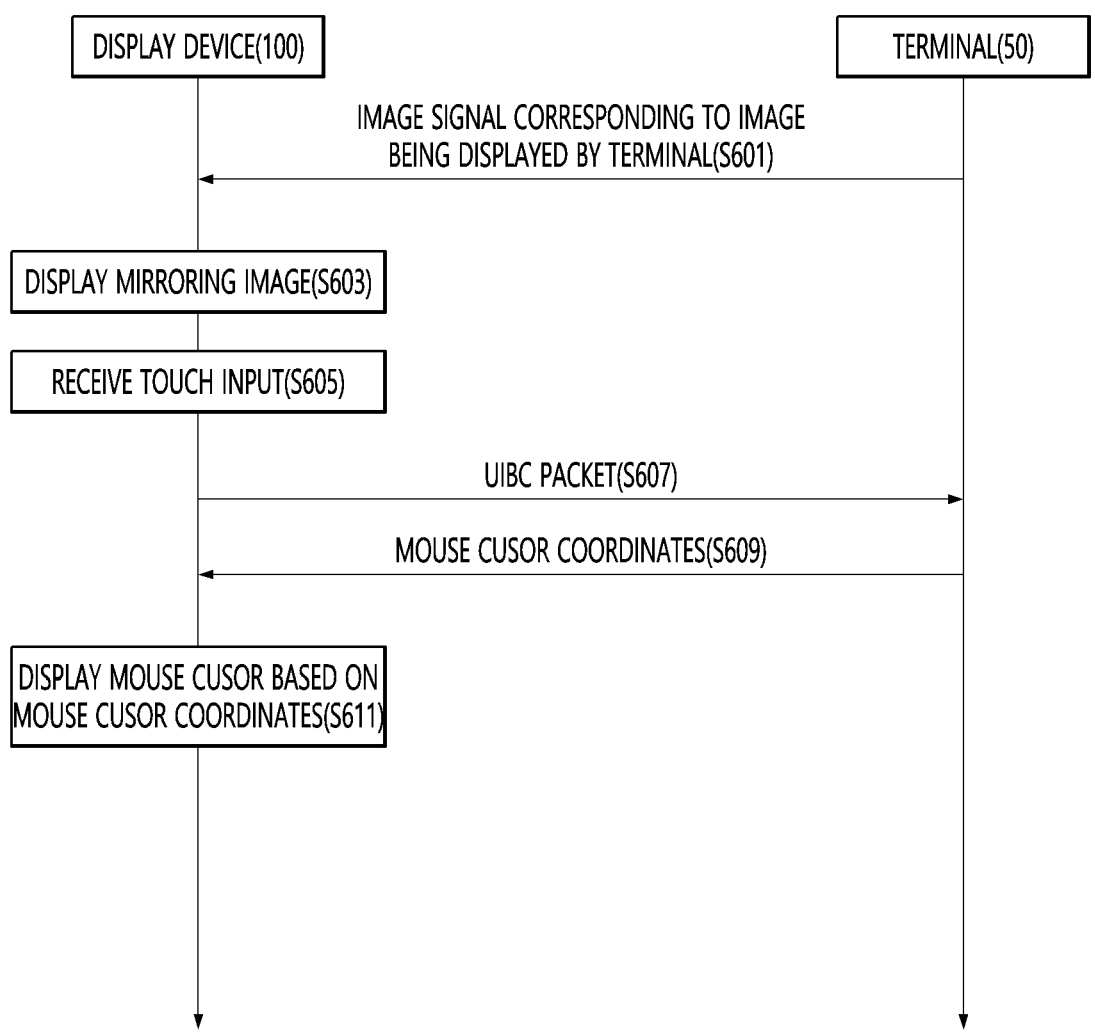
FIG. 6 is a diagram for describing a method of operating a screen sharing system according to the prior art.

FIG. 6 is a diagram for describing a method of operating a screen sharing system according to the prior art.

The screen sharing system includes a display device 10 and a terminal 50.

The terminal 50 may transmit a video signal corresponding to a video being displayed by the terminal 50 to the display device 100 (S601).

The display device 10 may display a mirroring video based on the received video signal (S603).

The display device 10 may receive a touch input while displaying the mirroring video (S605).

The display device 10 may transmit a UIBC packet to the terminal 50 according to the received touch input (S607).

The display device 10 may be connected to the terminal 50 supporting a mouse cursor function, and when receiving a touch input, may recognize the touch input as a mouse input. This is because the UIBC packet does not include a parameter capable of distinguishing a touch input and a mouse input.

That is, the display device 10 may recognize the touch input as a mouse input received through the mouse.

The UIBC packet may include coordinates of a point where the touch input is received and a parameter indicating that the touch input is a mouse input.

The coordinates of the touch input may be coordinates of a point at which the touch input is received.

The terminal 50 may transmit mouse cursor coordinates to the display device 10 based on the UIBC packet (S609).

The display device 10 may display a mouse cursor based on the mouse cursor coordinates (S611).

The embodiment of FIG. 6 will be described in detail with reference to FIGS. 7A and 7B.

Figure 7B:
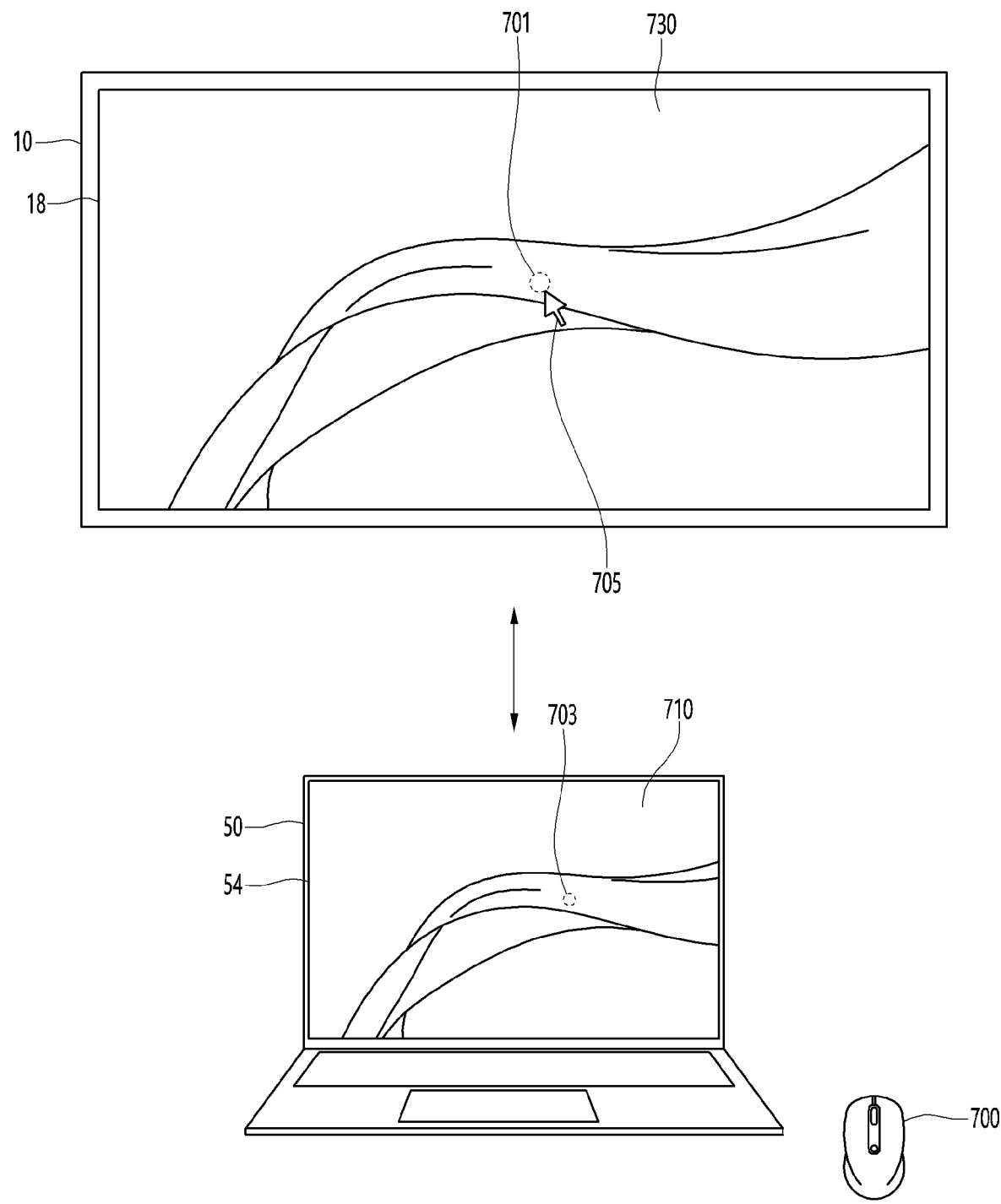

FIGS. 7A and 7B are diagrams for describing an operation scenario of using a user input back channel (UIBC) according to the related art.

The UIBC may be a channel for transmitting control information related to interaction through a user interface.

Specifically, the UIBC may be a channel for controlling the operation of the terminal 50 by applying a user input to the display device 10 while the display device 10 and the terminal 50 are performing a screen mirroring function.

Referring to FIG. 7A, the terminal 50 may display a video 710 on the display 54, and the display device 10 may display a mirroring video 730 corresponding to the video 710 on the display unit 18.

The display device 10 may receive a touch input at a first point 701 of the display unit 18 during mirroring. The first point 701 corresponds to a second point 703 of the display 54 of the terminal 50.

The display device 10 may transmit a UIBC packet including information on a touch input to the terminal 50.

The terminal 50 may obtain mouse cursor coordinates for generating a mouse cursor based on the coordinates of the touch input included in the UIBC packet, and transmit the obtained mouse cursor coordinates to the display device 10.

The display device 10 may display the mouse cursor 705 based on the mouse cursor coordinates at the first point 701 as shown in FIG. 7B.

According to the prior art, the user intends only to control the operation of the terminal 50 according to the touch input of the display device 10, but the mouse cursor 705 may be displayed unnecessarily.

In addition, when the user applies a touch input or a mouse input to the display device 10, the mouse cursor 705 may be displayed in both cases, so there is a problem in that the touch input and the mouse input cannot be distinguished.

According to an embodiment of the present disclosure, it is possible to allow a mouse cursor not to be displayed on the display device to distinguish a touch input from the mouse input, when the touch input is received.

FIG. 8 is a ladder diagram for describing a method of operating a screen sharing system according to an embodiment of the present disclosure.

The screen sharing system of FIG. 8 may include the display device 100 and the terminal 500. The description of each component of the display device 100 is referred to the description of FIG. 1, and the description of each component of the terminal 500 is referred to the description of FIG. 5.

Also, the display device 100 may be connected to the terminal 500 supporting a mouse cursor function to provide a screen sharing service.

Also, the display device 100 may receive a mouse input through a mouse 700 or receive a user's touch input. The mouse 700 may be connected through a user input interface unit 150.

Referring to FIG. 8, the control unit 170 of the display device 100 may receive a first video signal corresponding to a first video being displayed by the terminal 500 from the terminal 500 through the wireless communication unit 173 (S801).

The wireless communication unit 173 may include a Wi-Fi module. The wireless communication unit 173 may communicate with the terminal 500 through the Wi-Fi Direct standard.

The control unit 170 of the display device 100 may display a first mirroring video on the display unit 180 based on the received first video signal (S803).

The control unit 170 may convert the received first video signal into a signal with a resolution supported by the display device 100, and display the first mirroring video on the display unit 180 using the converted signal.

The control unit 170 of the display device 100 may receive a touch input at a point on the screen of the display unit 180 (S805).

The display unit 180 provided in the display device 100 may be implemented in the form of a touch screen.

The control unit 170 of the display device 100 may transmit a UIBC packet including no mouse cursor parameter to the terminal 500 according to the touch input received through the wireless communication unit 173 (S807).

The mouse cursor parameter may be a parameter that requests coordinates of a mouse cursor.

Since the UIBC packet does not include the mouse cursor parameter, the coordinates of the mouse cursor may not be required by the terminal 500.

The UIBC packet may include coordinates of a point at which a touch input is received, and information on the type of an input such as UP or DOWN.

The UIBC packet may be a control packet for allowing the terminal 500 to perform an operation corresponding to the touch input.

The control unit 170 may distinguish whether the received user input is a touch input or a mouse input. When a user input is received from a mouse connected through the external device interface unit 135, the control unit 170 may determine the user input as a mouse input.

When a touch on the display unit 180 is detected, the control unit 170 may determine the touch as a touch input.

When the received user input is a touch input, the control unit 170 may transmit a first UIBC packet including no mouse cursor parameter to the terminal 500.

When the received user input is a mouse input, the control unit 170 may transmit a second UIBC packet including a mouse cursor parameter to the terminal 500. The display device 100 may receive mouse cursor coordinates from the terminal 500 through the second UIBC packet and display a mouse cursor.

The processor 590 of the terminal 500 may perform a control operation based on the received UIBC packet (S809).

The processor 590 of the terminal 500 may not generate the mouse cursor coordinates based on the received UIBC packet. That is, the processor 590 of the terminal 500 may not generate the mouse cursor coordinates because the UIBC packet does not include the mouse cursor parameter.

The processor 590 may convert the coordinates of the touch input into coordinates suitable for the terminal's resolution, and perform a control operation on a point corresponding to the converted coordinates.

The processor 590 may display an application execution screen according to selection of an application icon located at a corresponding point.

The processor 590 may display an execution screen of a function corresponding to a menu according to the selection of the menu located at the corresponding point.

The processor 590 may switch from a first video to a second video according to the control operation according to the UIBC packet while the first video is being displayed.

The processor 590 of the terminal 500 may display the second video according to the result of operation execution, and transmit a second video signal corresponding to the second video to the display device 100 through the communication circuit 510 (S811).

The control unit 170 of the display device 100 may display a second mirroring video on the display unit 180 based on the received second video signal (S813).

According to the embodiment of the present disclosure, even when a touch input is applied to the display device 100 that is a sink device while a screen sharing service is being provided, the mouse cursor may not be displayed.

Accordingly, an unnecessary mouse cursor may not be displayed on the display device 100, and a control operation of the terminal 500 according to a touch input may be performed naturally.

The embodiment of FIG. 8 will be described in detail with reference to the drawings below.

FIGS. 9A and 9B are diagrams for describing a process in which a control operation of a terminal is performed according to a UIBC packet that does not include a mouse cursor parameter.

In FIGS. 9A and 9B, the display device 100 and the terminal 500 are providing a screen sharing service.

The terminal 500 may be a device supporting a mouse cursor function to draw a mouse cursor by transmitting mouse coordinates to the display device 100 according to the movement of a mouse.

The terminal 500 may serve as a source device for transmitting a first video signal based on a first video 910 being displayed on the terminal to the display device 100.

The display device 100 may serve as a sink device that displays a first mirroring video 930 through the display unit 180 based on the first video signal received from the terminal 500.

Each of the first video 910 and the first mirroring video 930 may include a plurality of app icons corresponding to a plurality of applications.

The display device 100 may receive a touch input for selecting a point 901 on a mirroring app icon 931 included in the first mirroring video 930.

The display device 100 may transmit a UIBC packet to the terminal 500 based on the received touch input.

The UIBC packet may include the coordinates of the point 901 at which the touch input is received, and information identifying UP or DOWN.

The UIBC packet may not include a mouse cursor parameter. The mouse cursor parameter may be a parameter for requesting information necessary to draw a mouse cursor.

The display device 100 may not include the mouse cursor parameter in order to prevent the terminal 500 from executing the mouse cursor function.

The terminal 500 may not transmit the mouse cursor coordinates for drawing the mouse cursor to the display device 100 based on the UIBC packet that does not include the mouse cursor parameter.

When the UIBC packet that does not include the mouse cursor parameter is received, the processor 590 of the terminal 500 does not generate the mouse cursor coordinates because the mouse cursor parameter does not exist.

The terminal 500 may select an app icon 911 corresponding to the mirroring app icon 931 according to the coordinates of the touch input and an input type (UP/DOWN).

That is, the control operation of the terminal 500 corresponding to the touch input received by the display device 100 may be an operation for executing an application installed in the terminal 500.

As illustrated in FIG. 9B, the terminal 500 may switch from the first video 910 to a second video 950 that is an execution screen of the application according to the execution of the application corresponding to the app icon 911.

The terminal 500 may transmit a second video signal corresponding to the second video 950 to the display device 100. Since the mouse cursor parameter does not exist in the UIBC packet received from the display device 100, the terminal 500 does not transmit the mouse cursor coordinates to the display device 100.

The display device 100 may convert the second video signal into a signal with the display device's resolution and display a second mirroring video 970 through the display unit 180.

Since the display device 100 did not receive the mouse cursor coordinates from the terminal 500, the display device 100 may not display the mouse cursor.

That is, even when a touch input is applied to the display device 100 that is a sink device during mirroring, the mouse cursor may not be displayed on the display device 100.

Accordingly, it is possible to reduce data resources required for displaying the mouse cursor and provide simple user experience.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described present disclosure is not limited to the configuration and method of the above-described embodiments, but the embodiments may be configured by selectively combining all or part of each embodiment such that various modifications can be made.

What is claimed is:

1. A display device comprising:
a wireless communication circuit configured to wirelessly receive a first video signal based on a first video being displayed by a terminal;
a display configured to display a first mirroring video based on the first video signal,
wherein the display is configured to receive touch inputs from a user; and
a control circuit configured to:
interface with a mouse,
receive a user input while the first mirroring video is being displayed,
determine whether the received user input is a touch input received by the display or is an input from the mouse and generate a corresponding determination result,
based on the determination result indicating that the user input is the touch input received by the display, transmit, to the terminal, a first type of User Input Back Channel (UIBC) packet,
wherein the first type of UIBC does not include a parameter for requesting coordinates of a mouse cursor, and
based on the determination result indicating that the user input is the input from the mouse transmit, to the terminal, a second type of UIBC packet,
wherein the second type of UIBC includes the parameter for requesting the coordinates of the mouse cursor.

2. The display device of claim 1, wherein the mouse cursor is a cursor that moves according to movement of the mouse interfaced to the terminal and is displayed through the display.

3. The display device of claim 1, wherein the control circuit is configured to receive, from the terminal, a second video signal indicating a result of a control operation performed in response to transmission of the packet, and display a second mirroring video based on the received second video signal.

4. The display device of claim 1, wherein, in response to the transmitted second type of UIBC packet, the control circuit is configured to receive the coordinates of the mouse cursor from the terminal, and display the mouse cursor based on the received coordinates of the mouse cursor.

5. The display device of claim 1, wherein the received user input is an input for selecting a menu or app icon included in the first mirroring video.

6. A method for controlling operations of a display by a control circuit, the display being interfaced to a mouse and being configured to receive touch inputs from a user, the method comprising:
wirelessly receiving a first video signal based on a first video being displayed by a terminal;
displaying a first minoring video based on the first video signal;
receiving a user input while displaying the first mirrored video;
determining whether the received user input is a touch input received by the display or is an input from the mouse, and generating a corresponding determination result;

based on the determination result indicating that the user input is the touch input received by the display, transmitting, to the terminal, a first type of User Input Back Channel (UIBC) packet,
wherein the first type of UIBC does not include a parameter for requesting coordinates of a mouse cursor; and
based on the determination result indicating that the user input is the input from the mouse transmitting, to the terminal, a second type of UIBC packet,
wherein the second type of UIBC includes the parameter for requesting the coordinates of the mouse cursor.

7. The method of claim 6, wherein the mouse cursor is a cursor that moves according to movement of the mouse interfaced to the terminal and is displayed through the display.

8. The method of claim 6, further comprising:
receiving, from the terminal, a second video signal indicating a result of a control operation performed in response to transmission of the packet; and
displaying a second mirroring video based on the received second video signal.

9. The method of claim 6, further comprising, in response to transmitting the second type of UIBC packet:
receiving the coordinates of the mouse cursor from the terminal; and
displaying the mouse cursor based on the received coordinates of the mouse cursor.

10. The method of claim 6, wherein the received user input is an input for selecting a menu or app icon included in the first mirroring video.

\* \* \* \* \*